(12) United States Patent
Akimoto et al.

(10) Patent No.: US 9,410,635 B2
(45) Date of Patent: Aug. 9, 2016

(54) FUEL VAPOR CONTROL DEVICE

(71) Applicant: Kyosan Denki Co., Ltd., Koga, Ibaraki-pref. (JP)

(72) Inventors: Yasuo Akimoto, Koga (JP); Nobuharu Muto, Kitakatsushika-gun (JP)

(73) Assignee: Kyosan Denki Co., Ltd., Koga, Ibaraki-pref. (JP)

( * ) Notice: Subject to any disclaimer, the term of this patent is extended or adjusted under 35 U.S.C. 154(b) by 0 days.

(21) Appl. No.: 14/676,911

(22) Filed: Apr. 2, 2015

(65) Prior Publication Data

US 2015/0285394 A1 Oct. 8, 2015

(30) Foreign Application Priority Data

Apr. 8, 2014 (JP) ................................. 2014-079607

(51) Int. Cl.
*F15D 1/02* (2006.01)
*F16K 17/30* (2006.01)
*G05D 7/01* (2006.01)

(52) U.S. Cl.
CPC .............. *F16K 17/30* (2013.01); *G05D 7/0133* (2013.01); *Y10T 137/7792* (2015.04)

(58) Field of Classification Search
USPC .............................................. 138/43, 45, 46
See application file for complete search history.

(56) References Cited

U.S. PATENT DOCUMENTS

| | | | | |
|---|---|---|---|---|
| 2,781,060 A * | 2/1957 | Frey | ...................... | D06F 39/088 138/46 |
| 3,561,471 A * | 2/1971 | Sands | ...................... | F16K 17/26 137/460 |
| 3,958,603 A * | 5/1976 | Bannon | .................. | F16K 15/144 137/517 |
| 4,383,552 A * | 5/1983 | Baker | ................... | G05D 7/0133 137/504 |
| 4,800,925 A * | 1/1989 | Yeoman | ............. | B60H 1/00485 137/15.09 |
| 4,940,538 A * | 7/1990 | Kyster | ...................... | C02F 1/34 137/494 |
| 5,462,081 A * | 10/1995 | Perusek | .................. | F16K 17/30 137/498 |
| 5,582,210 A * | 12/1996 | Bartholomew | ...... | G05D 7/0106 138/45 |
| 5,634,491 A * | 6/1997 | Benedict | .................... | E03C 1/08 137/504 |
| 6,173,734 B1 * | 1/2001 | Olivas | ..................... | F16K 17/30 137/458 |
| 2006/0260705 A1 * | 11/2006 | Baltes | .................... | F16L 55/027 138/26 |
| 2007/0289642 A1 * | 12/2007 | Knapp | .................. | F16K 15/026 137/528 |
| 2014/0246102 A1 | 9/2014 | Uno et al. | | |

FOREIGN PATENT DOCUMENTS

| | | |
|---|---|---|
| JP | 2011-122586 | 6/2011 |
| JP | 2013-083296 | 5/2013 |

* cited by examiner

*Primary Examiner* — James Hook
(74) *Attorney, Agent, or Firm* — Harness, Dickey & Pierce, P.L.C.

(57) ABSTRACT

A fuel vapor control device has a flow control valve which regulates a flow amount of fuel vapor from a fuel tank to a canister. The flow control valve has a movable element accommodated in a case. The movable valve element has a central cylindrical part, an outer cylindrical part, and a disc part which connects the central cylindrical part and the outer cylindrical part. The central cylindrical part provides a central channel. The central channel provides a main channel which communicates an inlet and an outlet. A sub channel defined and formed between the movable element and the case is opened and closed by a valve formed by the case and the outer cylindrical part. The central channel makes easy setting of flow amount in regulated condition. Since turbulence is reduced, it is possible to perform stable regulation.

17 Claims, 5 Drawing Sheets

FUEL VAPOR CONTROL DEVICE

CROSS REFERENCE TO RELATED APPLICATION

This application is based on Japanese Patent Application No. 2014-079607 filed on Apr. 8, 2014, the disclosure of which is incorporated herein by reference.

TECHNICAL FIELD

The present disclosure relates to a fuel vapor control device for controlling flow of fuel vapor, and may be used as a fuel vapor control device for suppressing discharge amount of fuel vapor generated in a fuel tank to the air.

BACKGROUND

Patent Literature 1 discloses a fuel vapor control device which controls flow of fuel vapor. This fuel vapor control device is a pressure compensation type flow control valve which maintains a flow amount in constant while the pressure changes. In this device, a valve element moves in accordance with a fluid pressure, and changes a passage area for the fluid.

Patent Literature 2 discloses a vent control valve which switches passages by moving a valve element.

PATENT LITERATURE

Patent Literature 1: JP2013-83296A
Patent Literature 2: JP2011-122586A

SUMMARY

According to Patent Literature 1, a passage area changes gradually as the valve element moves. Since this arrangement forms a variable passage area, it is difficult to provide a large passage area at the full open condition. Accordingly, it is difficult to lower a passage flow resistance, and to reduce pressure loss, and to realize a comparatively large flow amount. In another viewpoint, the channel of the variable passage area with a complicated configuration may make it difficult to perform a stable setting of flow amount. In the above viewpoint, or in the other viewpoint not mentioned above, further improvement is still required.

According to Patent Literature 2, a thin conical shaped portion of a movable valve opens and closes a small opening. By this arrangement, it is difficult to provide a large opening at the full open condition. Accordingly, it is difficult to lower a passage flow resistance, and to reduce pressure loss, and to realize a comparatively large flow amount. In order to realize a large flow amount, it is necessary to enlarge the size of a valve. But, such a large valve makes it difficult to practice. According to Patent Literature 2, since it is easy to produce turbulence, a flow amount may easily fluctuate while regulating a flow amount. In the above viewpoint, or in the other viewpoint not mentioned above, further improvement is still required.

It is an object of the present disclosure to provide a fuel vapor control device which can provide non-regulating condition providing a large opening enabling a large flow amount, and regulating condition which can stably regulate a flow amount.

It is another object of the present disclosure to provide a fuel vapor control device which is easy to set a flow amount in regulating condition.

It is another object of the present disclosure to provide a fuel vapor control device which is easy to manufacture.

The present disclosure employs the following technical means, in order to attain the above-mentioned object.

According to an embodiment, a fuel vapor control device for regulating a flow amount of fuel vapor disposed in a fuel vapor control system for controlling the fuel vapor is provided. The fuel vapor control device comprises, a case defining a passage for fuel vapor; and a movable valve element which is accommodated in the case and is supported so as to be displaced in an axial direction in accordance with a pressure, the movable valve having a seating portion for switching between a regulating condition in which the flow amount of fuel vapor is regulated and a non-regulating condition in which a flow amount larger than the regulating condition is permitted by being seated to and being lifted from a fixed seat disposed on the case. The movable valve element includes a central cylindrical part extending straight along the axial direction, which defines a central channel as a main channel of which passage area is constant according to the displacement of the movable valve element; and a flange part which is disposed so as to extend outwardly from the central cylindrical part, defines a gap as a sub channel between the case, and has the seating portion on a location outwardly distanced from the central cylindrical part.

According to this arrangement, a main channel of which a passage sectional area does not change according to a displacement of the movable valve element is defined and formed within the central cylindrical part. Accordingly, a flow amount in the regulating condition can be stably set by the main channel. In addition, since the central channel can provide a stable shape within the central cylindrical part, it is easy to set and design a shape for regulating it to a desired flow amount. Moreover, it is possible to dispose a seating part on a position outwardly separated more than the central cylindrical part. Accordingly, it is possible to open and close the sub channel with a large cross-sectional area. Therefore, according to this arrangement, it is possible to permit a large flow amount in the non-regulating condition, and to regulate the flow amount stable to a desired flow amount in the regulating condition.

According to an embodiment, the flange part comprises an annular disc part extending outwardly from the central cylindrical part, and an outer cylindrical part extending in the axial direction from a radial outside rim of the annular disc part, the outer cylindrical part having the seating part on an end thereof. According to this arrangement, the movable valve element having the central cylindrical part and the outer cylindrical part is provided. According to this structure, it is possible to form both the central channel which is easy to set a flow amount and a large diameter seating part separated in a radial outside from the central cylindrical part by a simple shape.

According to an embodiment, the central cylindrical part and the case has a guide mechanism which supports the movable valve element in a movable manner in the axial direction by contact between an outer surface of the central cylindrical part and the case, and forms an annular channel between the outer cylindrical part and the case. According to this arrangement, since the outer surface of the central cylindrical part is used as the guide mechanism, the annular channel as a sub channel can be disposed between the outer cylindrical part and the case.

According to an embodiment, the central cylindrical part has an outer surface disposed on a portion extending to protrude towards upstream side and/or downstream side from the outer cylindrical part. The case has a plurality of ribs which are arranged in a radial manner, and guide the movable valve element in a movable manner in the axial direction by contacting with the outer surface of the central cylindrical part. The guide mechanism is provided by the outer surface and the plurality of ribs. According to this arrangement, the movable valve element can be guided using the outer surface of the central cylindrical part. The sub channel can be disposed among the plurality of ribs.

According to an embodiment, the central cylindrical part is a circular cylinder straightly extending in the axial direction, and the central channel is a straight channel defined within the circular cylinder. According to this arrangement, the central channel, i.e., the main channel is provided by the straight channel with a circular cross section. Accordingly, it is easy to set a configuration for regulating to a desired flow amount. Accordingly, it is possible to stably regulate to a desired flow amount.

According to an embodiment, the fuel vapor control device further comprises a coil spring which is disposed in a radial inside of the outer cylindrical part, and biases the movable valve element towards a position for the non-regulating condition. The fuel vapor control device further comprises a guide cylindrical part disposed on the case or the movable valve element. The guide cylindrical part extends in the axial direction along the inside of the coil spring and is positioned in the radial inside of the coil spring to guide the coil spring. According to this arrangement, it is possible to perform a stable extension and contraction of the coil spring.

According to an embodiment, the fuel vapor control device further comprises a coil spring disposed in a radial inside of the outer cylindrical part. The coil spring biases the movable valve element towards a position for the non-regulating condition. The outer cylindrical part provides the guide cylindrical part which guides the coil spring. The outer cylindrical part is positioned on a radial outside of the coil spring and extends in the axial direction along an outside of the coil spring. According to this arrangement, since the coil spring is guided by the outer cylindrical part, the coil spring can stably perform extension and contraction.

According to an embodiment, the case has an opening penetrating the end wall providing the fixed seat. The opening is positioned on an imaginary extension of the central channel, and has a passage sectional area corresponding to the passage sectional area of the central channel. According to this arrangement, the channel corresponding to the central channel provided by the central cylindrical part is provided by penetrating the end wall. Accordingly, a flow amount set by the central channel is stably obtained while reducing adverse effect of the end wall.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Referring to drawings, embodiments of the present disclosure will be described hereinafter. In the embodiments, the same parts and components as those in each embodiment are indicated with the same reference numbers and the same descriptions will not be reiterated. In a consecutive embodiment, a correspondence is shown by using a similar reference symbol in which only hundred and more digits differ to indicate a part corresponding to a matter described in the previous embodiment, and the same description may not be repeated. In a case that only a part of component or part is described, other descriptions for the other embodiment may be referenced or incorporated as descriptions for the remaining part of component or part.

First Embodiment

Figure 1:
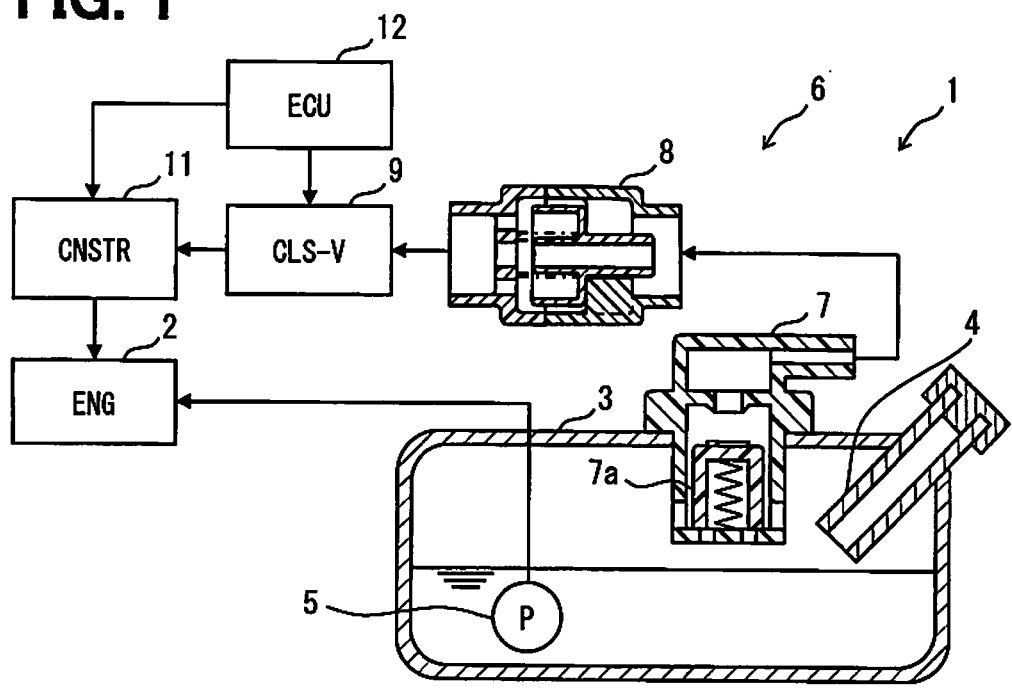
FIG. 1 is a block diagram showing a fuel vapor control system according to a first embodiment of the present disclosure.

Referring to FIG. 1, the present disclosure is implemented as a vehicle power system 1. The vehicle power system 1 has an engine (ENG) 2 mounted on the vehicle as a power source for the vehicle. The engine 2 is an internal combustion engine. The vehicle power system 1 has a fuel supply system for supplying a fuel to the engine 2. The fuel supply system has a fuel tank 3 for storing a fuel. A filler pipe 4 for fueling a fuel is disposed on the fuel tank 3. A liquid fuel is supplied from the filler pipe 4. The filler pipe 4 is projected into the fuel tank 3 as a cylindrical shape. The fuel supply system has a pump 5 which supplies the liquid fuel in the fuel tank 3 to the engine 2.

In order to refueling a fuel in the fuel tank 3 from the filler pipe 4, it is necessary to discharge gas from the inside of the fuel tank 3. Gas contains air and fuel vapor which is vapor of the fuel. In the following description, fuel vapor and air containing fuel vapor are also called vapor. Recently, it is required to reduce an amount of vapor discharge to the air. The vehicle power system 1 has a fuel vapor control system 6 in order to reduce an amount of vapor discharge.

The vapor control system 6 supplies vapor to the engine 2 and burns for disposal. The vapor control system 6 provides a vapor passage which communicates the fuel tank 3 and the intake pipe of the engine 2. The vapor passage is provided by a plurality of components and pipes. The vapor control system 6 has a liquid shut valve 7, a flow control valve 8, a closure valve (CLS-V) 9, and a charcoal canister (CNSTR) 11 in the vapor passage. The canister 11 is disposed between the engine 2 and the fuel tank 3. The flow control valve 8 is disposed between the canister 11 and the fuel tank 3. The closure valve 9 is disposed between the canister 11 and the flow control valve 8. The liquid shut valve 7 is disposed between the flow control valve 8 and the fuel tank 3.

The liquid shut valve 7 has a movable float valve 7a. The float valve 7a turns to an open condition and opens the passage, when the vehicle is in a normal position and the float valve 7a is not floated on the fuel. The float valve 7a turns to a close condition and closes the passage, when the vehicle is in a tilted position in an abnormal level, or the float valve 7a floats on the fuel, or the float valve 7a is sucked upwardly in an upside direction against the gravity.

The liquid shut valve 7 selectively allows vapor to flow out from the fuel tank 3 to the vapor passage. The liquid shut valve 7 can prevent liquid fuel from flowing out to the vapor passage. The liquid shut valve 7 opens to allows communication between the fuel tank 3 and the vapor passage, when an amount of the fuel in the fuel tank 3 is lower than a predetermined level during the vehicle is within a normal tilting range. The liquid shut valve 7 turns to the closed condition to disconnect a communication between the vapor passage and the fuel tank 3, when the fuel amount in the fuel tank 3 reaches a predetermined high level. The liquid shut valve 7 is also a float valve of which conditions are turned from the open condition to the closed condition, when the fuel reaches to the valve 7 by reaching a tilt angle of the vehicle to the abnormal range.

The flow control valve 8 is disposed between the fuel tank 3 and the canister 11, and opens and closes the vapor passage. The flow control valve 8 regulates a flow amount of gas flowing there through. The flow control valve 8 provides non-regulating condition and regulating condition. The flow control valve 8 provides a channel having a comparatively low first flow resistance in the non-regulating condition. The flow control valve 8 provides a predetermined first passage sectional area at a dominant passage part which contributes to regulate a flow amount among the channels provided therein, when it is in the non-regulating condition. The flow control valve 8 provides a channel which demonstrates second flow resistance larger than the above-mentioned first flow resistance in the regulating condition. The flow control valve 8 provides a second passage sectional area at the above-mentioned dominant passage part, which is narrower than the above-mentioned first passage sectional area, in the regulating condition. The passage sectional area is a cross section vertical to the direction of flow of the fluid in a target passage part, and indicates a cross-sectional area at a cross section effectively working as a channel. In many cases, a passage sectional area is a cross-sectional area in a cross section vertical to an axis AX.

The flow control valve 8 switches the non-regulating condition and the regulating condition by balance between a flow amount of fluid flowing therethrough, i.e., a pressure drop produced there, and a biasing force of a biasing means, such as the coil spring. The flow control valve 8 is biased towards the non-regulating condition so that it may usually be in the non-regulating condition in a normal condition. The flow control valve 8 provides the non-regulating condition, when the fluid flow therethrough in a backward direction. The backward direction is a direction toward the fuel tank 3 from the canister 11. The flow control valve 8 maintains the non-regulating condition until a flow amount of fluid flowing therethrough in a forward direction exceeds a predetermined amount. The flow control valve 8 is switched from the non-regulating condition to the regulating condition, when a flow amount of fluid flowing therethrough in the forward direction exceeds the predetermined amount, i.e., a pressure higher than a predetermined threshold acts on the movable valve element.

The closure valve 9 is an opening and closing valve including an electromagnetic valve. The closure valve 9 may have an electromagnetic valve electrically switched to an open condition and a close condition, and a differential pressure valve switched to an open condition and a close condition according to a pressure difference adjusted by the electromagnetic valve. Since the differential pressure valve has a diaphragm displaced according to the pressure difference, it may also be referred to as a diaphragm valve. The closure valve 9 can switch communicating condition between the fuel tank 3 and the canister 11 to the open condition and the close condition. The closure valve 9 may have functions as a relief valve which changes from a close condition to an open condition, if the pressure on a side to the fuel tank 3 reaches an unusually high pressure. The closure valve 9 may be used for various purposes, such as a purpose for controlling vapor discharge from the fuel tank 3, and a purpose for intentionally switching the fuel tank 3 to a sealed condition and a communicated condition for an inspection.

The canister 11 absorbs and stores the vapor temporarily. The canister 11 has absorbent, such as active charcoal capable of absorbing the vapor. The canister 11 discharges the vapor by supplying a fresh air which contains less fuel vapor.

The vapor control system 6 has a controller (ECU) 12. The controller 12 controls the closure valve 9 to open and close the closure valve 9. The controller 12 may control the closure valve 9 for various purposes. For example, the controller 12 may control the closure valve 9 to adjust the vapor amount of supply from the fuel tank 3 to the canister 11. Alternatively, the controller 12 may control the closure valve 9 to switch the fuel tank 3 to the sealed condition and the communicated condition intentionally for an inspection. The controller 12 controls the canister 11 to control absorbing the vapor to the canister 11 and discharging the vapor from the canister 11. Specifically, the controller 12 opens and closes a plurality of channels connected to the canister 11. For example, the controller 12 controls a purge valve which opens and closes a purge channel which supplies a fresh air to the canister 11.

The controller 12 is an electronic control unit. The controller has at least one processing unit (CPU) and at least one memory (MMR) as a storage medium which stores and memorizes a program and data. The controller is provided by a microcomputer which has a storage medium which can be read by computer. The storage medium is a non-transitory storage medium which stores a program readable by the computer. The storage medium may be provided with semiconductor memory or a magnetic disc. The controller may be provided with a computer or a set of computer resources linked by a data communication device. The program, when the controller executes the program, makes the controller to function as the apparatus described in this specification, and makes the controller to function to perform methods, such as control method, described in this specification. The controller provides various components. At least a part of the components may be referred to as means for performing function, and from the other viewpoint, at least a part of the components may be referred to as compositional block or module.

In the above-mentioned structure, when the closure valve 9 turns to the open condition and a large amount of fuel vapor passes the liquid shut valve 7 from the fuel tank 3, the vapor may move the float valve 7a to the close condition. As the liquid shut valve 7 is maintained at the close condition, lowering of an internal pressure of the fuel tank 3 is prevented. Accordingly, refueling operation to the fuel tank 3 may be adversely prevented. In order to prevent such a situation, the flow control valve 8 regulates a vapor flow amount flowing towards the canister 11 from the liquid shut valve 7. Thereby, the float valve 7a can keep the open condition. On the other hand, when there are comparatively few vapor flow amount, the flow control valve 8 turns to the non-regulating condition, and maintains a flow resistance in the vapor passage low.

Figure 2:
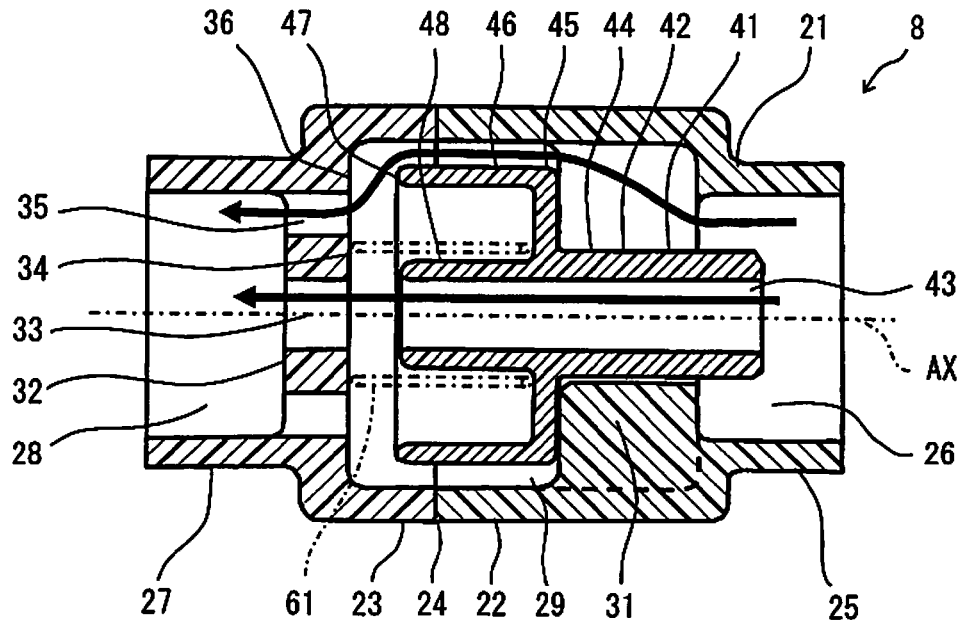
FIG. 2 is a cross sectional view showing a flow control valve of the first embodiment.
Figure 3:
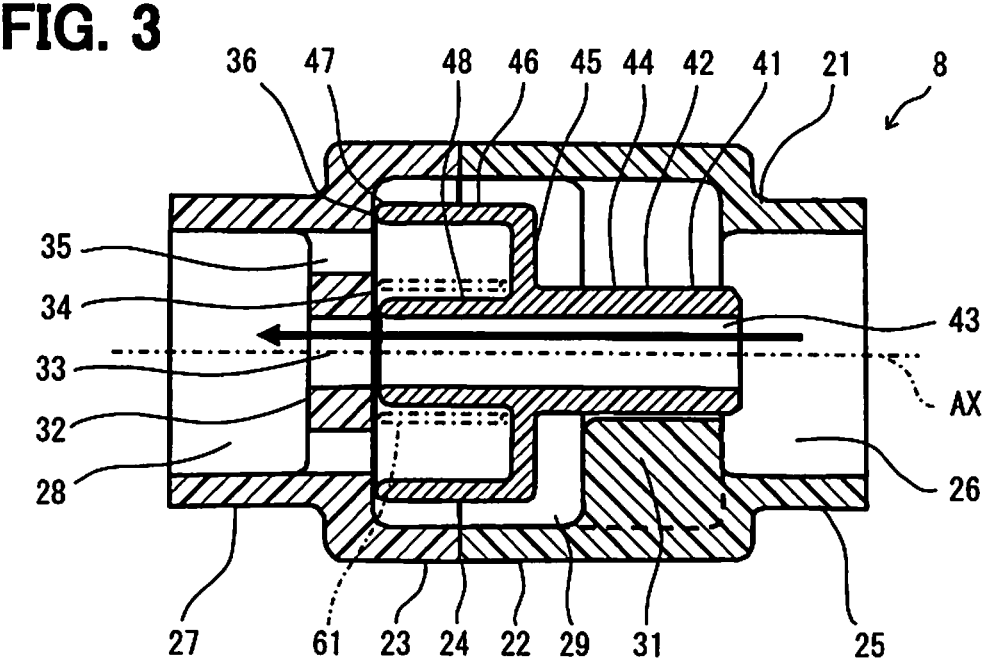
FIG. 3 is a cross sectional view showing a flow control valve of the first embodiment.

FIGS. 2 and 3 show cross sections of the flow control valve 8. FIG. 2 shows the open condition, i.e., the non-regulating condition, of the flow control valve 8. FIG. 3 shows the close condition, i.e., the regulating condition, of the flow control valve 8. An arrow symbol in the drawing shows a forward flow of the fuel vapor which goes to the canister 11 from the fuel tank 3. The flow control valve 8 has a case 21, a movable valve element 41, and a coil spring 61.

The case 21 defines a vapor passage in the flow control valve 8 and provides a fixed seat. The case 21 defines a vapor passage therein. The case 21 accommodates the movable valve element 41 and the coil spring 61 therein. The case 21 is formed in substantially a cylindrical shape. The case 21 is made of resin.

The case 21 has a cylindrical shape first case 22 and a cylindrical shape second case 23. The first case 22 and the second case 23 are joined and formed in a single member at the joined portion 24. The first case 24 and the second case 25 are joined by melting the material at the joined portion 24.

The first case 22 has an upstream pipe 25 located on a side to the fuel tank 3. The upstream pipe 25 defines and forms the inlet 26 which receives the fuel vapor supplied from the fuel tank 3. The upstream pipe 25 is formed to be connectable with a pipe for the vapor control system 6. The second case 23 has the downstream pipe 27 located on a side to the canister 11. The downstream pipe 27 defines and forms the outlet 28 which sends out the fuel vapor towards the canister 11. The downstream pipe 27 is formed to be connectable with a pipe for vapor control system 6. The case 21 defines and forms an internal chamber 29 which is capable of communicating the inlet 26 and the outlet 28. The internal chamber 29 is also an accommodation chamber for accommodating the movable valve element 41 and the coil spring 61 in the case 21.

The case 21 has a support mechanism 31, 32 which supports the movable valve element 41 in a movable manner in the axial direction of the movable valve element 41. In the following description, the word of axial direction indicates directions parallel to the axis AX. The support mechanism provides a stopper which restricts a moving range of the movable valve element 41. Here, a position of the movable valve element 41 in the non-regulating condition and a position of the movable valve element 41 in the regulating condition are defined by the support mechanism.

The support mechanism has a plurality of ribs 31 which protrude radially into the internal chamber 29 from an outer circumferential wall of the case 21. The plurality of ribs 31 provide channels through which the fuel vapor flows among them. The plurality of ribs 31 define and form a columnar space at a radial inside thereof. Distal ends on the radial inside of the plurality of ribs 31 provide an axial guide surface for guiding the movable valve element 41. End surfaces on the axial direction of the plurality of ribs 31 provide stoppers for restricting the axial movement of the movable valve element 41. The plurality of ribs 31 provide the stoppers which defines the position of the movable valve element 41 in the non-regulating condition.

The supporting mechanism has an end wall 32 located in the moving direction of the movable valve element 41. The end wall 32 is positioned on one end of the moving direction of the movable valve element 41, i.e., in the illustrated embodiment, one end of a direction in which the movable valve element 41 moves towards the regulating condition.

The end wall 32 has a plurality of openings 33 and 35 for passing the fuel vapor, which are extended to penetrate the end wall 32. The end wall 32 provides a seating surface 34 on which the coil spring 61 is seated. The end wall 32 also provides a fixed seat 36 which works with the movable valve element 41. The fixed seat 36 is an annular surface formed on an inner surface of the case 21. The openings 33 and 35 provide vapor channels.

The opening 33 is a central opening 33 formed coaxially with the axis AX of the movable valve element 41. The central opening 33 is positioned on an imaginary extension of the central channel 43, and has a passage sectional area corresponding to the passage sectional area of the central channel 43. The opening 35 is independently formed from the central opening 33 on a radial outside of the central opening 33. The opening 35 is an outside opening 35 located on a radial outside. The outside opening 35 is positioned on a position which is easy to pass the fuel vapor flowing through a sub channel, when the below-mentioned sub channel is opened.

The movable valve element 41 is supported within the case 21 in a movable manner in the axial direction. The movable valve element 41 defines and forms a channel which can pass the fuel vapor by working with the case 21. The movable valve element 41 defines and forms the above-mentioned channel, including the main channel which always opens and the sub channel which is opened and closed by the movable valve element 41, by working with the case 21. The movable valve element 41 provides an open-close valve for opening and closing the sub channel by working with the fixed seat 36 of the case 21. The main channel is defined and formed within the movable valve element 41. The sub channel is defined and formed between the case 21 and the movable valve element 41.

The movable valve element 41 is made of resin. The movable valve element 41 has an axis AX extending along a longitudinal direction thereof. The axis AX is also a central axis of the movable valve element 41 which has a shape defined as a solid of revolution.

The movable valve element 41 has a central cylindrical part 42 which is formed in a cylindrical shape and extends straightly along the axis AX. The central cylindrical part 42 is a circular cylindrical member of which inner surface and outside surface are in circular shapes. The central cylindrical part 42 defines and forms a central channel 43 therein. The central channel 43 penetrates the movable valve element 41 in the axial direction. The central channel 43 is a straight channel defined and formed within a circular cylinder. The central channel 43 provides a main channel. The central channel 43 has a passage sectional area corresponding to a central opening 33 disposed on the case 21. The central opening 33 and the central channel 43 are formed and arranged in a matching manner in order to provide a channel which substantially continues along a direction parallel to the axis AX.

The central channel 43 is positioned so as to communicate center portions of the inlet 26 and the outlet 28. The central channel 43 is communicated to a center portion of the passage cross section defined by the inlet 26 or the passage cross section defined by the outlet 28. The central channel 43 provides a channel which extends straightly towards the outlet 28 from the inlet 26. According to this structure, turbulences in the central channel 43 and before and after the central channel 43 are reduced. As a result, even if a flow amount varies, a fluctuation of a pressure loss produced there may be small, or within a predictable range. In another viewpoint, even if a pressure difference before and after the flow control valve 8 varies, a fluctuation of a flow amount of the fuel vapor passing through the flow control valve 8 may be small, or within a predictable range. Therefore, a pressure loss produced in the flow control valve 8 when the fuel vapor flows only through the central channel 43 may be easily set to a desirable value. For example, the pressure loss produced in the flow control valve 8 may be set by mainly using a length and a diameter of the central channel 43 as parameters.

The central cylindrical part 42 has an outer surface 44, which extends along the axis AX and has a circular cross section, on an exterior thereof. The outer surface 44 provides a guide surface for guiding the movable valve element 41 in the axial direction. A diameter of the circular cross section defined by the outer surface 44 is slightly smaller than a diameter of the guide surface defined and formed by the distal end of the plurality of ribs 31. As a result, the central cylindrical part 42 is movable in the axial direction by sliding the outer surface 44 on the distal end surfaces of the plurality of ribs 31.

The movable valve element 41 has flange part 45 and 46 disposed on a radial outside from the central cylindrical part 42. The flange part 45 and 46 extend outwardly from an outside surface 44 of the central cylindrical part 42. The flange part 45 and 46 are formed of a thin plate member. The flange part 45 and 46 provide a valve element for a valve which opens and closes the sub channel. The flange part 45 and 46 also provide a pressure receiving part for receiving a pressure difference produced by the fuel vapor flowing therethrough.

The flange part 45 and 46 has an annular disc part 45. The disc part 45 extends towards an outside along a radial direction from the outer surface 44. The disc part 45 spreads in a plate shape over an annular range on a radial outside of the central cylindrical part 42. The disc part 45 is a plate member which extends along a plane vertical to the axis AX. The disc part 45 does not reach the inner surface of the case 21. A diameter of the disc part 45 is smaller than the inner diameter of the internal chamber 29 formed by the case 21. Therefore, an annular gap is defined and formed between the disc part 45 and the case 21.

The flange part 45 and 46 has an outer cylindrical part 46. The outer cylindrical part 46 is positioned on a radial outside of the central cylindrical part 42. The outer cylindrical part 46 is a cylindrical member extending at a radial outside of the central cylindrical part 42 and extending in parallel to the central cylindrical part 42. The outer cylindrical part 46 is a circular cylindrical shape. The central cylindrical part 42 and the outer cylindrical part 46 are connected by the disc part 45. The outer cylindrical part 46, the central cylindrical part 42, and the disc part 45 are integrally molded by a resin material. The end of the outer cylindrical part 46 and the radial outside rim of the disc part 45 are continuing. The upstream side end of the outer cylindrical part 46 continues to the disc part 45. A radial inside rim of the disc part 45 continues to the central cylindrical part 42.

The outer cylindrical part 46 has the annular seating part 47 on an end thereof. The seating part 47 is disposed on the downstream end of the outer cylindrical part 46. The seating part 47 works with the fixed seat 36 to provide a valve for opening and closing the sub channel. The sub channel is closed when the seating part 47 abuts on the fixed seat 36. The sub channel is opened when the seating part 47 is lifted from the fixed seat 36.

The movable valve element 41 can open and close a large cross-sectional area, since the seating part 47 is formed on the outer cylindrical part 46. As a result, it is possible to provide the sub channel having a large cross-sectional area. Therefore, when the movable valve element 41 is lifted from the fixed seat 36, a large passage sectional area can be provided by the main channel and the sub channel. In other words, a channel having a small flow resistance is provided. On the other hand, when the movable valve element 41 rests on the fixed seat 36, it closes the sub channel with large cross-sectional area. Therefore, it is possible to enlarge a difference between a passage sectional area provided only by the main channel and a passage sectional area provided by both the main channel and the sub channel. According to this embodiment, a large passage sectional area can be provided in the non-regulating condition, a passage sectional area sufficiently regulated can be provided in the regulating condition, and it is further easy to set a flow amount and/or pressure loss to a desirable value in the regulating condition.

The central cylindrical part 42 has a guide cylindrical part 48 positioned in a radial inside of the outer cylindrical part 46. The guide cylindrical part 48 may be recognized as a part of the central cylindrical part 42. The guide cylindrical part 48 forms the outer cylindrical part 46 and a double cylindrical part. The guide cylindrical part 48 also defines and forms the central channel 43. In the illustrated example, an outside diameter of the guide cylindrical part 48 is slightly smaller than the outside diameter of the central cylindrical part 42 which extends longer than the outer cylindrical part 46. A downstream end of the guide cylindrical part 48 is located on the same position as the seating part 47 with respect to the axial direction, or on a position slightly upstream side from the seating part 47.

The guide cylindrical part 48 is positioned on a radial inside of the coil spring 61, and extends in the axial direction along the inside of the coil spring 61, and guides the coil spring 61. The guide cylindrical part 48 works also as a guide member for the coil spring 61. The guide member reduces lateral movement of the coil spring 61. In a manufacturing method of the flow control valve 8 by assembling the movable valve element 41 and the coil spring 61 into the case 21, the guide cylindrical part 48 allows to employ a manufacturing step of accommodating the components into the case 21 after pre-assembling the coil spring 61 onto the guide cylindrical part 48 in a covering manner. Thus, the guide cylindrical part 48 works also as a holding part for temporarily holding the coil spring 61. The guide cylindrical part 48 can also be recognized as the other portion from the central cylindrical part 42.

The movable valve element 41 is manufactured by a resin molding process which uses molding dies dividable in the axial direction. The configuration having the central cylindrical part 42 and the outer cylindrical part 46, and connecting them by the disc part 45 is suitable for such a resin molding process.

The coil spring 61 provides biasing means to bias the movable valve element 41 to the non-regulating condition. The coil spring 61 is arranged between the case 21 and the movable valve element 41 in slightly compressed condition a free length. The coil spring 61 is arranged in the annular depression defined by the outer cylindrical part 46, the disc part 45, and the guide cylindrical part 48. This structure eases an assembling work for the movable valve element 41 and the coil spring 61. The coil spring 61 pushes the movable valve element 41 to the upstream side, i.e., towards the non-regulating condition. The coil spring 61 is also setting means by which the flow control valve 8 sets a threshold value at which it is switched from the non-regulating condition to the regulating condition.

The controller 12 may control the closure valve 9 in order to adjust a flow amount of the fuel vapor flowing to the canister 11 from the fuel tank 3 in a proper amount. The controller 12 may interrupts a flow of the fuel vapor to the canister 11 from the fuel tank 3 by the closure valve 9. In these cases, the flow control valve 8 is in the non-regulating condition, i.e., the open condition, as shown in FIG. 2. Both the main channel and the sub channel are opened at this time. Therefore, a flow resistance of the vapor passage between the fuel tank 3 and the canister 11 can be reduced into a comparatively small value.

The controller 12 may open the closure valve 9 to reduce the pressure in the vapor passage. The controller 12 may open the closure valve 9 to permit a large flow amount of the fuel vapor towards the canister 11 from the fuel tank 3. For example, the controller 12 may release the pressure in the fuel tank 3 toward a direction to the canister 11 by opening the closure valve 9, after maintaining the fuel tank 3 in a closed state. In these cases, the flow control valve 8 automatically turns from the non-regulating condition to the regulating condition.

When a high pressure acts on the movable valve element 41 from the upstream side, or when the flow amount of the fuel vapor flowing around the movable valve element 41 becomes a predetermined large flow amount, the pressure difference produced on both sides of the movable valve element 41 acts to move the movable valve element 41 against the biasing force of the coil spring 61. As a result, the movable valve element 41 moves towards the downstream side, i.e., towards the valve closing position. The sub channel which is defined and formed between the inner surface of the case 21 and the outer surface of the movable valve element 41, especially, between the outer cylindrical part 46 and the case 21, is disposed on a radial outside area out of the inside area of the flow control valve 8. An annular gap formed between the fixed seat 36 and the seating part 47 is also disposed on the radial outside area out of the inside area of the flow control valve 8. Therefore, even if the movable valve element 41 moves in the axial direction, in most part of movable range, the cross-sectional area of the sub channel does not change substantially.

When the seating part 47 rests on the fixed seat 36, the sub channel is interrupted altogether in an instant. When the movable valve element 41 rests on the fixed seat 36, as shown in FIG. 3, the fuel vapor flows only through the main channel which is defined and formed by the central channel 43, without passing through the sub channel which is defined and formed between the movable valve element 41 and the case 21. Since the central channel 43 is a channel extending in straight, it is easy to determine a flow amount flowing therethrough. Therefore, a length and/or a diameter of the central channel 43 can be set to permit a desirable flow amount. In addition, since the central channel 43 is disposed in the center section of the vapor passage provided by the flow control valve 8 and extends straight, less generating turbulences and less fluctuations of a flow amount may be realized. Therefore, the flow control valve 8 can stably regulate a flow amount.

In this embodiment, the flow control valve 8 is provided as a fuel vapor control device which is disposed in the fuel vapor control system 6 for controlling the fuel vapor, and regulates a flow amount of the fuel vapor. The flow control valve 8 has the case 21 which defines and forms the channel for the fuel vapor. The flow control valve 8 further has the movable valve element 41 which is accommodated in the case 21, and is supported so as to be displaced in the axial direction according to a pressure. The movable valve element 41 has the seating part 47 which switches between the regulating condition for regulating a flow amount of the fuel vapor and the non-regulating condition for permitting a larger flow amount than that of the regulating condition by seating and lifting against the fixed seat 36 disposed on the case 21. The movable valve element 41 has the central cylindrical part 42 extending straight along the axial direction. The central cylindrical part 42 defines the central channel 43 as the main channel of which passage area is constant according to the displacement of the movable valve element. In addition, the movable valve element 41 has the flange part 45 and 46 which is disposed so as to extend outwardly from the central cylindrical part 42. The flange part 45 and 46 defines a gap as the sub channel between it and the case 21. The flange part 45 and 46 have the seating portion 47 on a location outwardly distanced from the central cylindrical part 42.

According to this embodiment, the main channel of which the passage sectional area is constant according to the displacement of the movable valve element 41 is defined and formed on an inside of the central cylindrical part 42. Accordingly, a flow amount in the regulating condition can be stably set by the main channel. Since the central channel 43 can provide a stable shape in the central cylindrical part 42, it is easy to set the shape for regulating to a desirable flow amount. The seating part 47 can be disposed on a position outwardly distanced from the central cylindrical part 42 on a radial outside. Accordingly, it is possible to open and close the sub channel having a large cross-sectional area. Therefore, it is possible to permit a large flow amount in the non-regulating condition, and to perform stable regulation to a desirable flow amount in the regulating condition.

The flange parts 45 and 46 may have the disc part 45 and the outer cylindrical part 46. The disc part 45 is formed in an annular shape and extends in a radial outside direction from the central cylindrical part 42. The outer cylindrical part 46 extends in the axial direction from the radial outside rim of the disc part 45. The outer cylindrical part 46 has the seating part 47 on an end thereof. By this structure, the movable valve element 41 with the central cylindrical part 42 and the outer cylindrical part 46 is provided. According to this structure, it is possible to dispose both the central channel 43, which is easy to set a flow amount, and the seating part 47, which is outwardly distanced from the central cylindrical part 42 and has a large diameter, by a simple configuration.

In this embodiment, the central cylindrical part 42 and the case 21 has a guide mechanism which supports the movable valve element 41 in a movable manner in the axial direction by contact between an outer surface 44 of the central cylindrical part 42 and the case 41, and forms an annular channel between the outer cylindrical part 46 and the case 21. The central cylindrical part 42 has the outer surface 44 disposed on a portion extending to protrude towards upstream side and/or downstream side from the outer cylindrical part 46. The case has a plurality of ribs 31 which are arranged in a radial manner, and guide the movable valve element 41 in a movable manner in the axial direction by contacting with the outer surface 44 of the central cylindrical part 42. The guide mechanism is provided by the outer surface 44 and the plurality of ribs 31. Since the outer surface 44 of the central cylindrical part 42 is used as the guide mechanism, it is possible to form an annular channel as a sub channel between the outer cylindrical part 42 and the case 21. It is possible to form a sub channel among the plurality of ribs 31.

According to this embodiment, the central channel 43, i.e., the main channel is provided by the straight channel having a circular cross section. Accordingly, setting and designing a configuration for regulating a flow amount to a desired flow amount is easy. As a result, the device can stably set a flow amount in the regulating condition, while permitting a large flow amount in the non-regulating condition.

Second Embodiment

Figure 4:
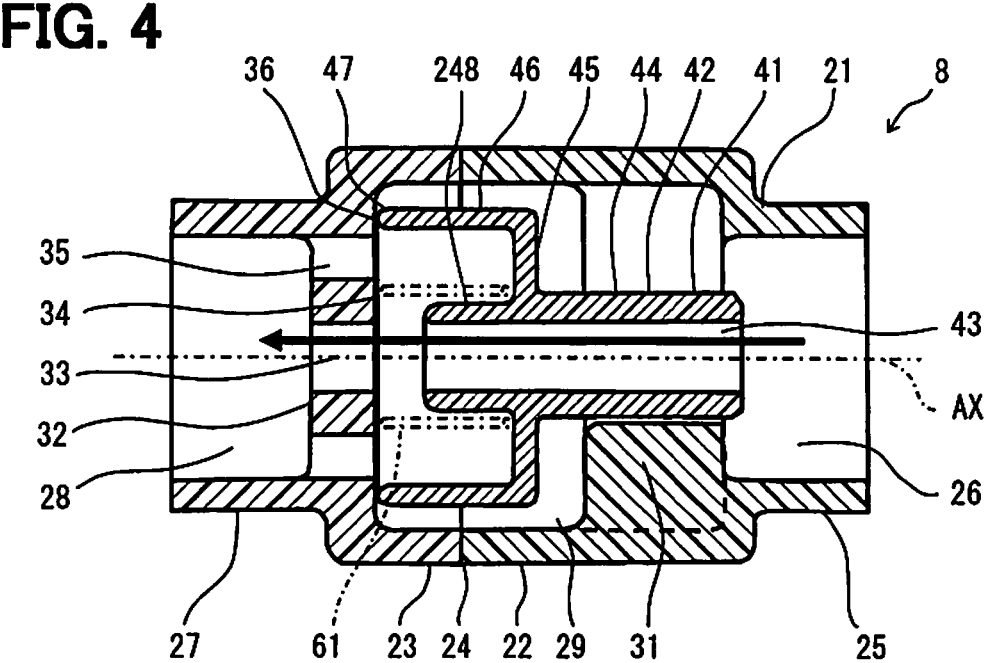
FIG. 4 is a cross sectional view showing a flow control valve of a second embodiment.

This embodiment is one of modifications based on a basic form provided by the preceding embodiment. In the above-mentioned embodiment, an end of the outer cylindrical part 46 and an end of the guide cylindrical part 48 are closely positioned. Alternatively, as shown in FIG. 4, a guide cylindrical part 248 which has apparently shorter than the outer cylindrical part 46 may be used. According to this structure, interference with the end wall 32 and the guide cylindrical part 248 is reduced.

Third Embodiment

Figure 5:
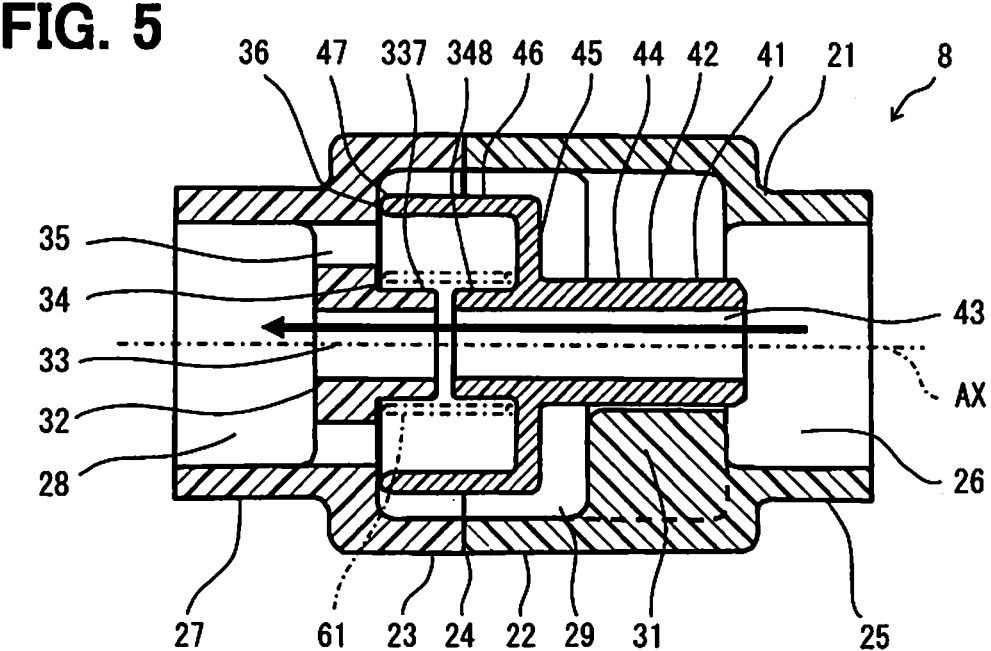
FIG. 5 is a cross sectional view showing a flow control valve of a third embodiment.

This embodiment is one of modifications based on a basic form provided by the preceding embodiment. In the above-mentioned embodiments, only the movable valve element 41 has the guide cylindrical part 48 which works as a guide for the coil spring 61. Alternatively, as shown in FIG. 5, a guide cylindrical part 337, which can work as a guide part for guiding the coil spring 61 and/or a holding part for at least temporarily holding the coil spring 61, may be disposed on the end wall 32. In this embodiment, a short guide cylindrical part 348, which can work as a guide part for guiding the coil spring 61 and/or a holding part for at least temporarily holding the coil spring 61, is also disposed on the movable valve element 41. According to this structure, it is possible to employ a manufacturing method of assembling the movable valve element 41, after assembling the coil spring 61 in the second case 23.

Fourth Embodiment

Figure 6:
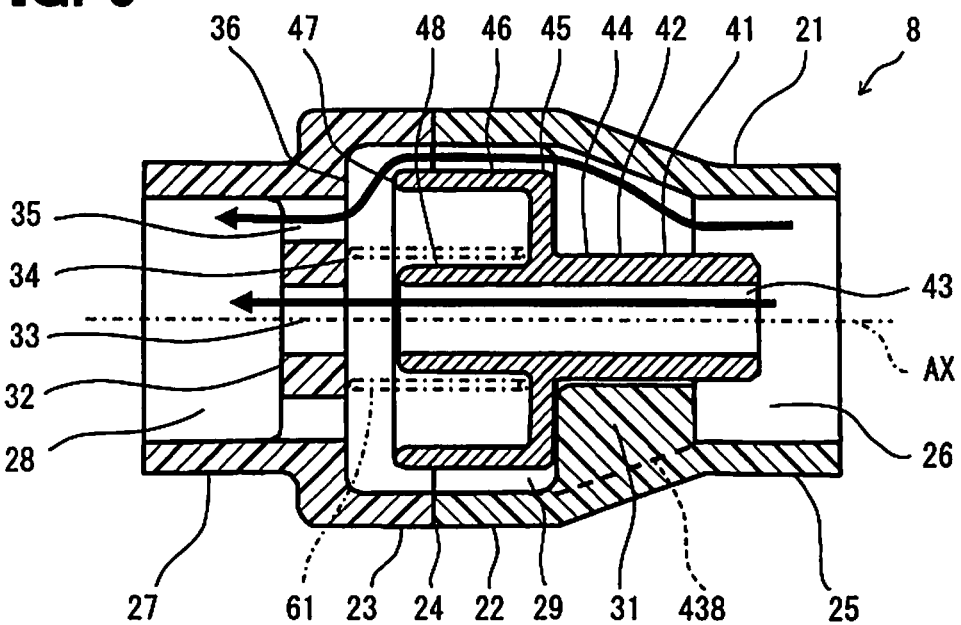
FIG. 6 is a cross sectional view showing a flow control valve of a fourth embodiment.

This embodiment is one of modifications based on a basic form provided by the preceding embodiment. In the above-mentioned embodiment, a stepped part which suddenly expands a passage sectional area is disposed between the inlet 26 and the internal chamber 29 within the case 21. Alternatively, as shown in FIG. 6, a connecting passage 438 which gradually changes a passage sectional area from the inlet 26 towards the internal chamber 29 may be disposed between the inlet 26 and the internal chamber 29.

An inner wall of the connecting passage 438 provides a passage sectional area gradually expanding from the inlet 26 towards the internal chamber 29. According to this structure, a flow resistance of the fuel vapor mainly flowing through the sub channel is reduced.

Fifth Embodiment

Figure 7:
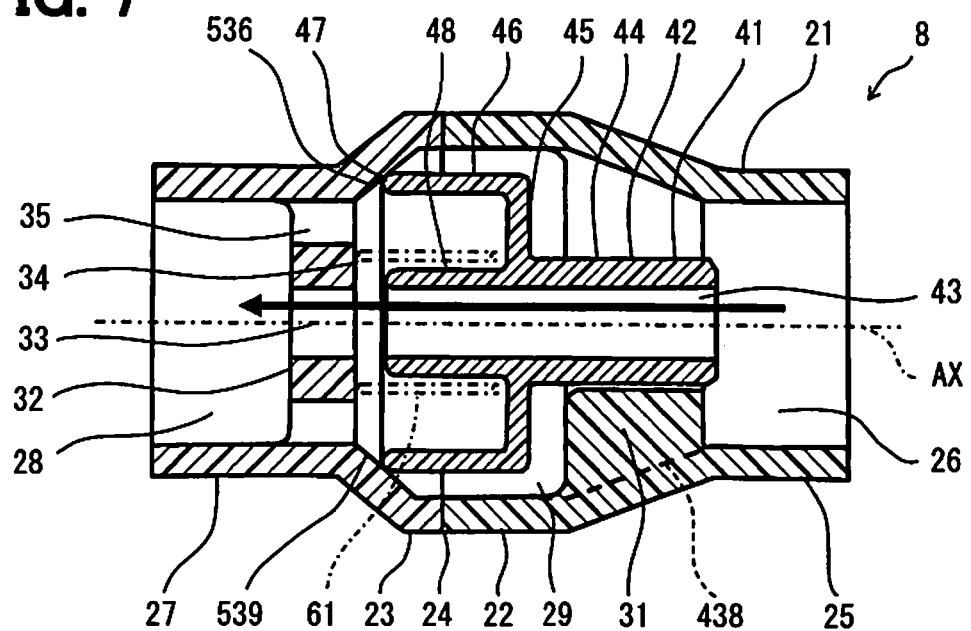
FIG. 7 is a cross sectional view showing a flow control valve of a fifth embodiment.

This embodiment is one of modifications based on a basic form provided by the preceding embodiment. In the above-mentioned embodiment, the connecting passage 438 is disposed only on an upstream side. Alternatively, as shown in FIG. 7, a connecting passage 539 which gradually changes a passage sectional area from the internal chamber 29 towards the outlet 28 may be disposed between the internal chamber 29 and the outlet 28.

An inner wall of the connecting passage 539 provides a passage sectional area gradually decreasing from the internal chamber 29 towards the outlet 28. According to this structure, a flow resistance of the fuel vapor mainly flowing through the sub channel is reduced. According to this embodiment, a fixed seat 536 with a cone-inner-surface shape is formed. The fixed seat 536 provides a cone inner surface which decreases a cross-sectional area from an upstream side towards a downstream side. Since the seating part 47 rests on the cone inner surface of the fixed seat 536, the seating part 47 is automatically centered. Therefore, stable closed condition is acquired. In addition, only the connecting channel 538 may be employed without using the coupling channel 438.

Sixth Embodiment

Figure 8:
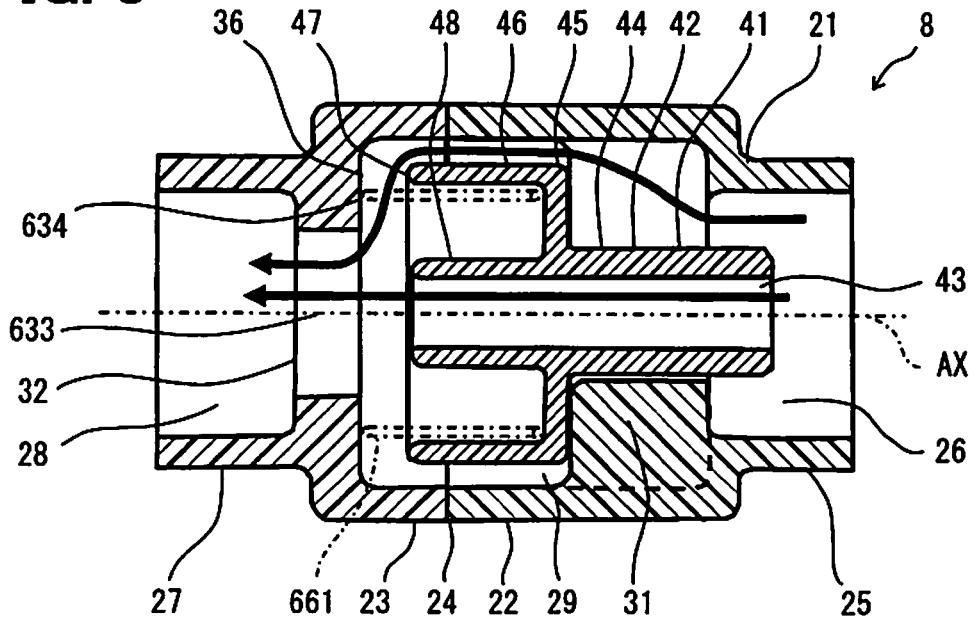
FIG. 8 is a cross sectional view showing a flow control valve of a sixth embodiment.

This embodiment is one of modifications based on a basic form provided by the preceding embodiment. In the above-mentioned embodiments, the device has the coil spring 61 which has an inner diameter slightly larger than the outside diameter of the guide cylindrical part 48. Alternatively, as shown in FIG. 8, a coil spring 661, which has a large diameter about slightly smaller than the outer cylindrical part 46. With this structure, the outer cylindrical part 46 is positioned close to a radial outside of the coil spring 661. The outer cylindrical part 46 extends in the axial direction along the outside of the coil spring 661, and provides the guide cylindrical part for guiding the coil spring 661.

With this structure, in order to dispose a seat portion 634 for the coil spring 661, a comparatively large opening 633 is disposed on the center of the end wall 32. According to this structure, it is possible to employ a manufacturing method of assembling the coil spring 611 in the case 21, after temporarily holding the coil spring 661 in a radial inside of the outer cylindrical part 46.

Seventh Embodiment

Figure 9:
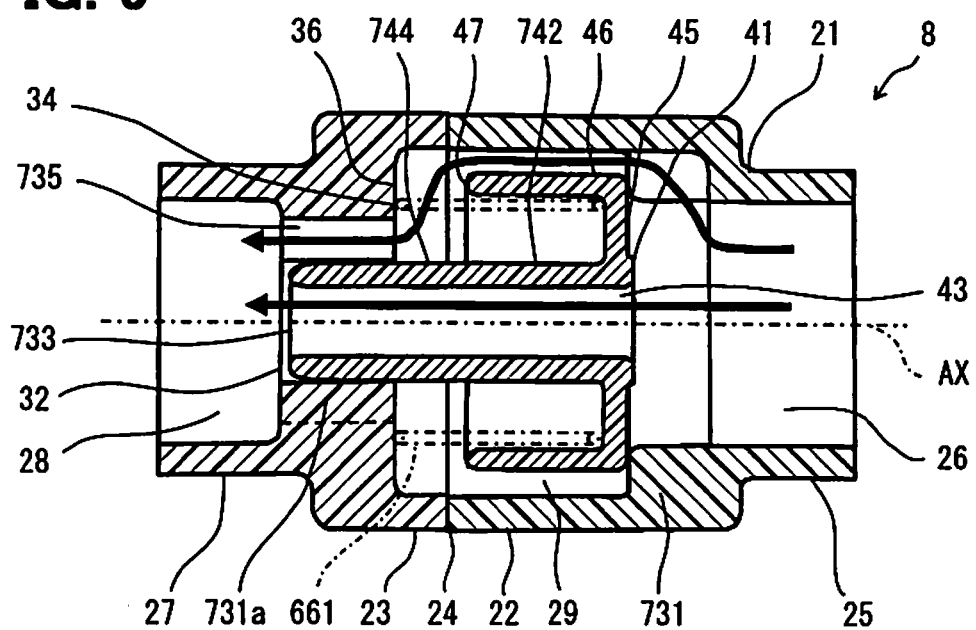
FIG. 9 is a cross sectional view showing a flow control valve of a seventh embodiment.

This embodiment is one of modifications based on a basic form provided by the preceding embodiment. In the above-mentioned embodiments, the guide mechanisms 31 and 44 for guiding the movable valve element 41 are disposed on an upstream side of the outer cylindrical part 46. Alternatively, as shown in FIG. 9, guide mechanisms 731*a* and 744 may be disposed on a downstream side of the the outer cylindrical part 46.

The case 21 has a plurality of ribs 731 disposed on the upstream side from the movable valve element 41. The ribs 731 have radial height which is lower than the ribs 31 in the preceding embodiments. The ribs 731 work as stoppers which restricts movable amount of the movable valve element 41 in the upstream side. The ribs 731 do not work as the guide part.

The case 21 has an opening 733 which penetrates the end wall 32. The case 21 has a plurality of openings 735 formed in slots which penetrates the end wall 32. The plurality of openings 735 are positioned on a radial outside of the opening 733 in a radially arranged manner. The end wall 32 has a plurality of ribs 731*a*, in order to define and form the above-mentioned opening 733 and a plurality of openings 735. The plurality of ribs 731*a* inwardly extend from the case 21 in a radial inside direction. Distal end surfaces on the radial inside of the plurality of ribs 731*a* are arranged in a circular shape, and define and form the opening 733 having a circular shape. Side surfaces of the plurality of ribs 731*a* and bottom surfaces between the ribs define and form the opening 735. The distal end surfaces of the plurality of ribs 731*a* provide the guide mechanism which supports the movable valve element 41 in a movable manner along the axial direction.

The movable valve element 41 has a central cylindrical part 742 which extends from the disc part 45 towards the downstream side. The central cylindrical part 742 is a circular cylindrical shape. Outer surfaces 744 of the central cylindrical part 742 can contacts on the distal end surfaces of the plurality of ribs 731. In addition, the outer surfaces 744 can slide on the plurality of ribs 731*a* in the axial direction. Therefore, the plurality of ribs 731*a* and the central cylindrical parts 742 provide the guide mechanism.

Other Embodiments

The present disclosure is not limited to the above embodiments, and the present disclosure may be practiced in various modified embodiments. The present disclosure is not limited to the above combination, and disclosed technical means can be practiced independently or in various combinations. Each embodiment can have an additional part. The part of each embodiment may be omitted. Part of embodiment may be replaced or combined with the part of the other embodiment. The configurations, functions, and advantages of the above-mentioned embodiments are just examples. The technical scope of disclosure is not limited to the embodiment. Some extent of the disclosure may be shown by the scope of claim, and also includes the changes, which is equal to and within the same range of the scope of claim.

For example, means and functions of the control device 10 may be provided by only software, only hardware or a combination of the software and the hardware. For example, the control device may be made of an analogue circuit.

In the preceding embodiments, the disc part 45 is formed as an annular disc extending outwardly from the central cylindrical part 42 and 742. Alternatively, an annular plate with a conical shape extending from the central cylindrical part 42 may be used as the disc part.

In the above descriptions, an embodiment which has the central cylindrical part 42, which works as the guide mechanism, on the upstream side to the outer cylindrical part 46, and an embodiment which has the central cylindrical part 742, which works as the guide mechanism, on the downstream side to the outer cylindrical part 46 are illustrated and explained. Alternative to the embodiments, a central cylindrical part, which works as the guide mechanism, may be disposed on both the upstream side and the downstream side to the outer cylindrical part 46.

In the preceding embodiments, the central cylindrical parts 42 and 742 are circular cylinders. Alternatively, a polygonal cylinder, such as a hexagonal cylinder may be used. Moreover, an orifice, which is smaller in passage sectional area than the other parts of the central channel 43, may be disposed on a part of the central channel 43 within the central cylindrical part 42 and 742.

In the preceding embodiments, the biasing member is provided by the coil spring 61. Alternatively, a biasing member for biasing the movable valve element 41 to the non-regulating condition by magnetic force, a biasing member for biasing the movable valve element 41 to the non-regulating condition by using weight of the movable valve element 41, etc. can be used. In the preceding embodiments, the guide cylindrical parts 48, 248, 348, and 337 for guiding the coil spring 61 are disposed. Alternatively, a movable valve element without the guide cylindrical parts 48, 248, 348, and 337 may be used.

In the preceding embodiments, the flow control valve 8 is provided as one independent component. Alternatively, the flow control valve 8 may be provided as a part of the other components in the fuel vapor control system, or a composite component. In this structure, the flow control valve 8 works as the fuel vapor control device.

What is claimed is:

1. A fuel vapor control device for regulating a flow amount of fuel vapor disposed in a fuel vapor control system for controlling the fuel vapor, the fuel vapor control device comprising:
   a case defining a passage for the fuel vapor; and
   a movable valve element which is accommodated in the case and is supported so as to be displaced in an axial direction in accordance with a pressure, the movable valve having a seating portion for switching between a regulating condition in which the flow amount of fuel vapor is regulated and a non-regulating condition in which a flow amount larger than the regulating condition is permitted by being seated to and being lifted from a fixed seat disposed on the case, wherein
   the movable valve element includes:
   a central cylindrical part extending straight along the axial direction, which defines a central channel as a main channel of which passage area is constant according to the displacement of the movable valve element; and
   a flange part which is disposed so as to extend outwardly from the central cylindrical part; wherein
   the flange part defines a gap as a sub channel between the case and the flange part,
   the flange part has the seating portion on a location outwardly distanced from the central cylindrical part; and
   the flange part comprises:
   an annular disc part extending outwardly from the central cylindrical part; and
   an outer cylindrical part extending in the axial direction from a radial outside rim of the annular disc part, the outer cylindrical part having the seating portion on an end thereof, the seating portion and the fixed seat opening the sub channel in the non-regulating condition and close the sub channel in the regulating condition.

2. The fuel vapor control device in claim 1, wherein the central cylindrical part and the case has a guide mechanism which supports the movable valve element in a movable manner in the axial direction by contact between an outer surface of the central cylindrical part and the case, and an annular channel is formed between the outer cylindrical part and the case.

3. The fuel vapor control device in claim 2, wherein the central cylindrical part has the outer surface disposed on a portion extending to protrude towards an upstream side and/or a downstream side from the outer cylindrical part, and wherein
   the case has a plurality of ribs which are arranged in a radial manner, the plurality of ribs guide the movable valve element in a movable manner in the axial direction by contacting with the outer surface of the central cylindrical part, and wherein
   the guide mechanism is provided by the outer surface and the plurality of ribs.

4. The fuel vapor control device in claim 1, wherein the central cylindrical part is a circular cylinder straightly extending in the axial direction, and the central channel is a straight channel defined within the circular cylinder.

5. The fuel vapor control device in claim 1, further comprising:
   a coil spring disposed in a radial inside of the outer cylindrical part, the coil spring biases the movable valve element towards a position for the non-regulating condition; and
   a guide cylindrical part disposed on the case or the movable valve element, the guide cylindrical part extending in the axial direction along the inside of the coil spring and being positioned in the radial inside of the coil spring to guide the coil spring.

6. The fuel vapor control device in claim 1, further comprising:
   a coil spring disposed in a radial inside of the outer cylindrical part, the coil spring biasing the movable valve element towards a position for the non-regulating condition, wherein
   the outer cylindrical part provides a guide cylindrical part which guides the coil spring, the outer cylindrical part being positioned on a radial outside of the coil spring and extending in the axial direction along an outside of the coil spring.

7. The fuel vapor control device in claim 1, wherein the case has an opening penetrating the end wall providing the fixed seat, the opening being positioned on an imaginary extension of the central channel, and having a passage sectional area corresponding to the passage sectional area of the central channel.

8. The fuel vapor control device in claim 7, further comprising a biasing element urging the movable valve element into the direct engagement with the stop.

9. The fuel vapor control device in claim 7, further comprising a biasing element urging the valve element into the direct engagement with the stop.

10. The fuel vapor control device in claim 1, wherein the case provides a fixed stop for the movable valve element, the movable valve element directly engaging the fixed stop when the movable valve element is in the non-regulating position.

11. A fuel vapor control device regulating a flow of fuel vapor disposed in a fuel vapor control system, the fuel vapor control device comprising:
 a case defining a fixed seat and a passage for the fuel vapor;
 a valve element disposed within the case, the valve element being movable in an axial direction in accordance with a pressure of the fuel vapor, the valve element defining a seating portion, the valve element moving between a regulating condition where the seating portion directly engages the fixed seat and a non-regulating condition where the seating portion is spaced from the fixed seat to define a gap as a sub channel, a flow amount of the fuel vapor in the non-regulating condition being greater than a flow amount of the fuel vapor in the regulating condition; wherein
 the valve element includes a central cylindrical part extending in the axial direction;
 the central cylindrical part defines a main channel having a constant passage area in both the regulating condition and the non-regulating condition;
 the valve element includes an annular disc extending radially outward from the central cylindrical part and an outer cylindrical part extending in the axial direction from a radially outer end of the annular disc; and
 the seating portion is disposed on an end of the outer cylindrical part opposite to the annular disc.

12. The fuel vapor control device in claim 11, wherein the case provides a fixed stop for the valve element, the valve element directly engaging the fixed stop when the valve element is in the non-regulating position.

13. The fuel vapor control device in claim 11, wherein the central cylindrical part and the case has a guide mechanism which supports the valve element in a movable manner in the axial direction by contact between an outer surface of the central cylindrical part and the case, and an annular channel is formed between the outer cylindrical part and the case.

14. The fuel vapor control device in claim 13, wherein the central cylindrical part has the outer surface disposed on a portion extending to protrude towards an upstream side and/or a downstream side from the outer cylindrical part, and wherein
 the case has a plurality of ribs which are arranged in a radial manner, the plurality of ribs guide the valve element in a movable manner in the axial direction by contacting with the outer surface of the central cylindrical part, and wherein
 the guide mechanism is provided by the outer surface and the plurality of ribs.

15. The fuel vapor control device in claim 11, further comprising:
 a coil spring disposed in a radial inside of the outer cylindrical part, the coil spring biases the valve element towards a position for the non-regulating condition; and
 a guide cylindrical part disposed on the case or the valve element, the guide cylindrical part extending in the axial direction along the inside of the coil spring and being positioned in the radial inside of the coil spring to guide the coil spring.

16. The fuel vapor control device in claim 11, further comprising:
 a coil spring disposed in a radial inside of the outer cylindrical part, the coil spring biasing the valve element towards a position for the non-regulating condition, wherein
 the outer cylindrical part provides a guide cylindrical part which guides the coil spring, the outer cylindrical part being positioned on a radial outside of the coil spring and extending in the axial direction along an outside of the coil spring.

17. The fuel vapor control device in claim 11, wherein the case has an opening penetrating the end wall providing the fixed seat, the opening being positioned on an imaginary extension of the central channel, and having a passage sectional area corresponding to the passage sectional area of the central channel.

\* \* \* \* \*